(12) United States Patent
Bickham et al.

(10) Patent No.: US 7,773,846 B2
(45) Date of Patent: Aug. 10, 2010

(54) LARGE EFFECTIVE AREA HIGH SBS THRESHOLD OPTICAL FIBER

(75) Inventors: Scott Robertson Bickham, Corning, NY (US); Dana Craig Bookbinder, Corning, NY (US); Ming-Jun Li, Horseheads, NY (US); Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 17 days.

(21) Appl. No.: 12/072,655

(22) Filed: Feb. 27, 2008

(65) Prior Publication Data

US 2009/0060436 A1 Mar. 5, 2009

Related U.S. Application Data

(60) Provisional application No. 60/904,081, filed on Feb. 28, 2007.

(51) Int. Cl.
*G02B 6/032* (2006.01)
(52) U.S. Cl. ....................................... 385/125
(58) Field of Classification Search ............... 385/125
See application file for complete search history.

(56) References Cited

U.S. PATENT DOCUMENTS

| 6,317,551 B1 | 11/2001 | Mitchell et al. | 385/124 |
| 6,952,519 B2 | 10/2005 | Bickham et al. | 385/127 |
| 6,959,135 B1 | 10/2005 | Bickham et al. | 385/123 |
| 7,082,243 B2 | 7/2006 | Bickham et al. | 385/127 |
| 7,164,835 B2 | 1/2007 | Matsuo et al. | 385/127 |
| 7,221,840 B2 * | 5/2007 | Vienne et al. | 385/126 |
| 7,444,838 B2 * | 11/2008 | Pickrell et al. | 65/435 |
| 2004/0218882 A1 | 11/2004 | Bickham et al. | 385/127 |
| 2006/0039664 A1 | 2/2006 | Bickham | 385/127 |
| 2006/0120677 A1 | 6/2006 | Broeng et al. | 385/125 |
| 2007/0104437 A1 | 5/2007 | Bookbinder et al. | 385/125 |

FOREIGN PATENT DOCUMENTS

| EP | 1291686 | 3/2003 |
| EP | 1426795 | 6/2004 |
| EP | 1437612 | 7/2004 |
| EP | 1564569 | 8/2005 |
| WO | WO01/79672 | 10/2001 |
| WO | WO02/084350 | 10/2002 |
| WO | WO03/010576 | 2/2003 |

(Continued)

OTHER PUBLICATIONS

Jeunhomme, Luc B., "Principles and Applications", *Single-Mode Fiber Optics*, Second Edition, 1990, pp. 39-44.

(Continued)

*Primary Examiner*—Jerry T Rahll
(74) *Attorney, Agent, or Firm*—Robert L. Carlson

(57) ABSTRACT

Microstructured optical fiber for transmitting optical signals comprised of light, the optical fiber including a core region and a cladding region surrounding the core region, the cladding region including at least one annular region having an index of refraction lower than that of the remainder of the cladding. The optical fiber provides an absolute SBS threshold in dBm greater than about $9.3 + 10 \log[(1-e^{-(0.19)(50)/4.343})/(1-e^{-(\alpha)(L)/4.343})]$, wherein L is the length in km and $\alpha$ is the attenuation in dB/km at 1550 nm, and a fiber cutoff wavelength of less than 1400 nm.

25 Claims, 4 Drawing Sheets

FOREIGN PATENT DOCUMENTS

| WO | WO03/100488 | 12/2003 |
| WO | WO2004/100406 | 11/2004 |
| WO | WO2005/109056 | 11/2005 |

OTHER PUBLICATIONS

BuAbbud et al., "Optical impairments, including Raman and Brillouin Non-Linearities, in Broadband WDM-Overlay Single Fiber PONs—Measurements, Remedies and Design Optimization Guidelines", NFOEC, 2003.

U.S. Appl. No. 11/800,161, filed May 4, 2007, "Microstructured Transmission Optical Fiber".

* cited by examiner

LARGE EFFECTIVE AREA HIGH SBS THRESHOLD OPTICAL FIBER

CROSS-REFERENCE TO RELATED APPLICATIONS

This application claims the benefit of, and priority to U.S. Provisional Patent Application No. 60/904,081 filed on Feb. 28, 2007, the content of which is relied upon and incorporated herein by reference in its entirety.

BACKGROUND OF THE INVENTION

1. Field of the Invention

The present invention relates to high SBS threshold optical fibers. More preferably, the present invention relates to high SBS threshold optical fibers having large effective area.

2. Technical Background

Stimulated Brillouin Scattering (SBS) is a dominant nonlinear penalty in many optical transmission systems. In many systems, the launching of large power to optical fiber while maintaining high signal to noise ratio (SNR) is desirable. However, as the launch power or signal power of an incident signal launched into an optical fiber increases, the launch power may exceed a certain threshold power and part of the signal power gets reflected due to SBS as a reflected signal. An undesirably large amount of the signal power can thus be reflected back toward the transmitter due to SBS. In addition, the scattering process increases the noise level at the signal wavelength. The combination of decrease in signal power and increase in the noise both lower the SNR and lead to performance degradation.

At finite temperatures, thermal excitations occur in glasses similar to phonons in crystals, and the interaction of these vibrational modes with low intensity signal light produces spontaneous Brillouin scattering. An intense optical field generates pressure or sound waves through electrostriction due to the beating of intense incident and spontaneous reflected light giving rise to pressure or acoustic waves. The change in pressure causes material density to change, thereby resulting in refractive index fluctuations. The net result is that an intense electrical field component of the optical wave generates pressure or sound waves which cause density fluctuations. The acoustic wave changes the refractive index and enhances the reflected light amplitude through Bragg diffraction. Above the SBS threshold of an optical fiber, the number of stimulated photons is very high, resulting in a strong reflected field which limits the optical power that is transmitted and which reduces the SNR.

SUMMARY OF THE INVENTION

One aspect of the present invention relates to an optical fiber having a high SBS threshold. The optical fiber guides at least one optical mode and a plurality of acoustical modes, including an $L_{01}$, acoustical mode and an $L_{02}$ acoustical mode. The optical fiber comprises a core having a refractive index profile and a centerline and a cladding layer surrounding and directly adjacent the core. The core comprises a plurality of segments, preferably three segments that include a central segment, a moat segment, and a ring segment. The cladding region of the fiber includes at least one annular region having an index of refraction lower than that of the remainder of the cladding. In some embodiments, the at least one annular region in said cladding comprises fluorine, while in some other embodiments, the at least one annular region in said cladding is formed by non-periodically disposed holes which are located in the annular region. The non-periodically disposed holes cause the refractive index of the hole containing region to be less than that of the remainder (i.e., the portion of the cladding which does not contain holes) of the silica cladding.

The refractive index profile of the core is selected to result in the fiber exhibiting an absolute SBS threshold in dBm greater than about $9.3+10\log[(1-e^{-(0.19)(50)/4.343})/(1-e^{-(\alpha)(L)/4.343})]$, wherein L is the length in km and $\alpha$ is the attenuation in dB/km at 1550 nm wherein the optical fiber has a fiber cutoff of less than 1400 nm. More preferably, the refractive index of the core is selected to provide: an absolute SBS threshold in dBm greater than about $9.8+10\log[(1-e^{-(0.19)(50)/4.343})/(1-e^{-(\alpha)(L)/4.343})]$, wherein L is the length in km and $\alpha$ is the attenuation in dB/km at 1550 nm, wherein e is the mathematical constant 2.71828 (shown truncated to 5 decimal places and also sometimes expressed as "exp"). For comparison, 50 km of standard single mode fiber with a step index core and an attenuation of 0.19 dB/km such as SMF-28e® optical fiber from Corning Incorporated has an SBS threshold of about 6.8 dBm.

DETAILED DESCRIPTION OF THE PREFERRED EMBODIMENTS

Figure 1:
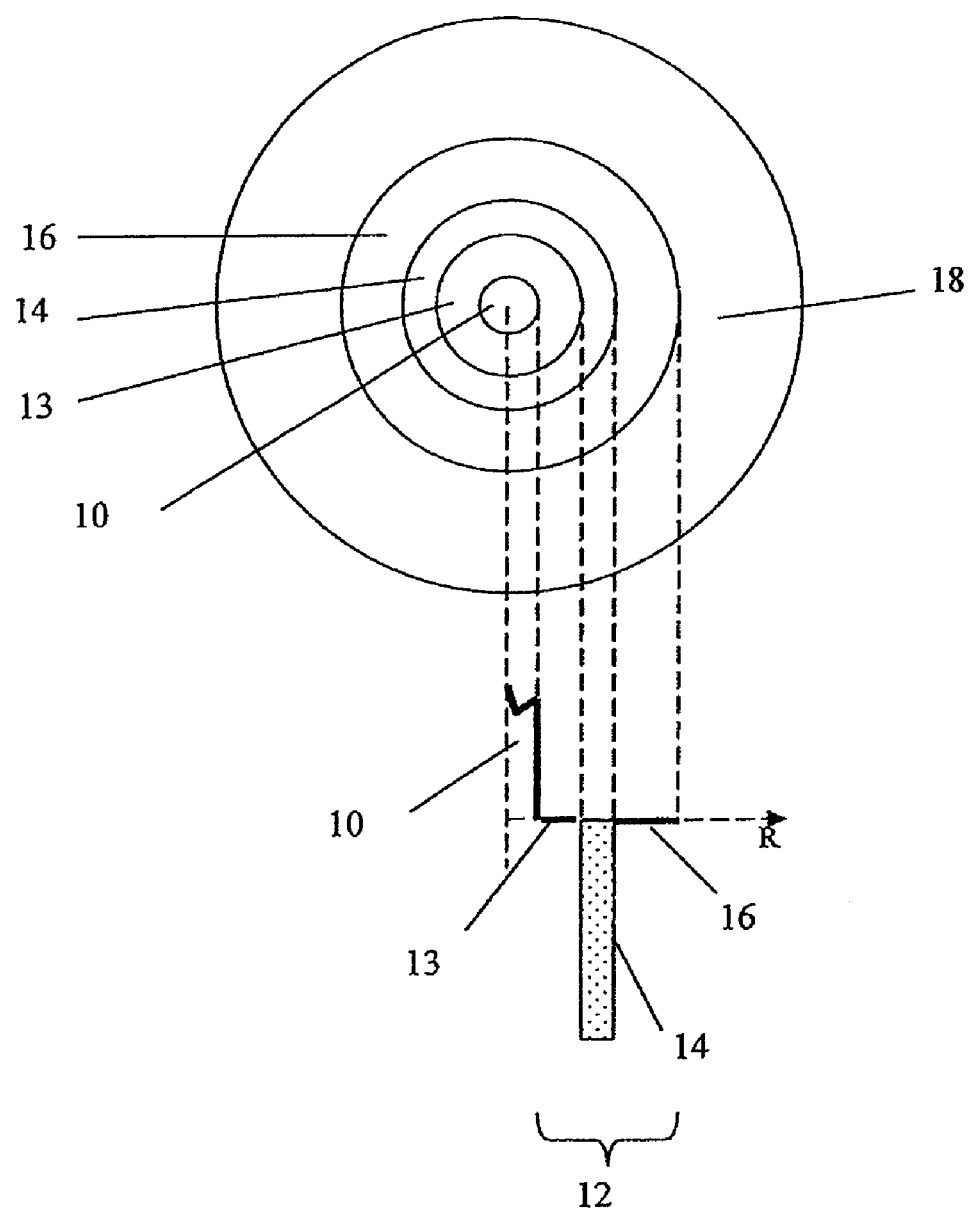
FIG. 1 illustrates a first exemplary optical fiber and refractive index profile in accordance with the invention.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius as measured at 1550 nm. As used herein, refractive index is expressed as delta percent or "relative refractive index percent", and is defined as $\Delta\% = 100 \times (n_i^2 - n_c^2)/2n_i^2$, where $n_i$ is the maximum refractive index in region i, unless otherwise specified, and $n_c$ is the refractive index of the non-down doped portion of the cladding region (for example, outer clad region 16 in the embodiment illustrated in FIG. 1). As used herein, the relative refractive index is represented by $\Delta$ and its values are given in units of "%", unless otherwise specified.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi \frac{\left(\int_0^\infty f^2 r\,dr\right)^2}{\int_0^\infty f^4 r\,dr}, \quad \text{(Eq. 1)}$$

where the integration limits are 0 to ∞, and f is the transverse component of the electric field associated with light propagated in the waveguide wherein r is the radius from the center of the optical fiber. As used herein, "effective area" or "$A_{eff}$" refers to optical effective area at a wavelength of 1550 nm unless otherwise noted.

The mode field diameter (MFD) is measured using the Peterman II method wherein, $$2w = MFD, \text{ and } w^2 = 2\int_0^\infty f^2 r\,dr \bigg/ \int_0^\infty \left(\frac{df}{dr}\right)^2 r\,dr. \quad \text{(Eq. 2)}$$

The bend resistance of a waveguide fiber can be gauged by induced attenuation under prescribed test conditions.

The downdoped annular ring region 14 has a profile volume, V, defined herein as:

$$2\int_{R_o}^{R_i} \Delta_5(r)\,dr.$$

where $R_i$ is the radius of the inside of the down doped annular ring (sometimes referred to herein as $R_5$) and is $R_o$, is the radius of the outside of the down doped annular ring. Volume as reported or discussed herein is expressed in terms of percent-microns².

The 10, 15, and 20 mm macrobend tests consist of wrapping the fiber 5 times around a 10, 15, or 20 mm diameter mandrel, respectively, and measuring the induced attenuation (i.e. the increase in attenuation) caused by wrapping the fiber around the mandrel.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an ideally perfect fiber that has no attenuation and under the perfectly straight deploy condition without any perturbations (e.g. no diameter variation).

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to longer fiber length and higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP10 mode at a wavelength of 1550 nm.

A waveguide fiber telecommunications link, or simply a link, is made up of a transmitter of light signals, a receiver of light signals, and a length of waveguide fiber or fibers having respective ends optically coupled to the transmitter and receiver to propagate light signals there between. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

FIG. 1 illustrates a cross-section and the refractive index profile of one optical fiber which exhibits a high SBS threshold in accordance with the present invention. The optical fiber guides at least one optical mode and a plurality of acoustical modes, including an $L_{01}$ acoustical mode and an $L_{02}$ acoustical mode. The optical fiber comprises a core 10 having a refractive index profile and a centerline and a cladding layer 12 surrounding and directly adjacent the core.

The cladding region 12 of the fiber includes at least one annular region 14 having an index of refraction lower than that of the remainder of the cladding 12. Preferably down doped annular region 14 is spaced from core 10 by inner cladding region 13. In some embodiments, the at least one annular region in said cladding comprises fluorine, while in some other embodiments, the at least one annular region in said cladding is formed at least in part by providing non-periodically disposed holes in the annular region. The non-periodically disposed holes cause the refractive index of the hole containing region to be less than that of the remainder (i.e., the portion of the cladding which does not contain holes) of the silica cladding.

The refractive index profile of the core is selected to result in the fiber exhibiting an absolute SBS threshold in dBm at 1550 nm greater than about $9.3+10\log[(1-e^{-(0.19)(50)/4.343})/(1-e^{-(\alpha)(L)/4.343})]$, wherein L is the length in km and α is the attenuation in dB/km at 1550 nm wherein the optical fiber has a fiber cutoff of less than 1400 nm. More preferably, the refractive index of the core is selected to provide: an absolute SBS threshold in dBm at 1550 nm greater than about $9.8+10\log[(1-e^{-(0.19)(50)/4.343})/(1-e^{-(\alpha)(L)/4.343})]$, wherein L is the length in km and α is the attenuation in dB/km at 1550 nm.

The SBS threshold varies with the length and attenuation of the fiber under test. Generally, a very short length of an optical fiber will tend to have a higher SBS threshold than a very long length of the same fiber. Also, generally, a length of one optical fiber having a higher attenuation will tend to have a higher SBS threshold than the same length of another similar optical fiber having a lower attenuation. An approximate analytical expression is given in "Optical impairments, including Raman and Brillouin Non-Linearities, in Broadband WDM-Overlay Single Fiber PONs—Measurements, Remedies and Design Optimization Guidelines," G. H. BuAbbud et al., NFOEC 2003:

$$P_{th}(L) \approx 21 \frac{\alpha A_{\text{eff}}}{g_B^{\text{eff}}[1 - \exp^{(-\alpha L)}]} \quad \text{(Eq. 3)}$$

where $g_B^{\text{eff}}$ is the effective Brillouin gain coefficient, $\alpha$ is the attenuation in dB/Km, L is the fiber length, $A_{\text{eff}}$ is the optical effective area and $P_{th}$ is the SBS threshold power. In this simple approximation, the SBS threshold is inversely proportion to the effective length of the fiber. Thus, if the measured threshold for a length $L_1$ is $P_1$, then the threshold at length $L_2$ is $$P_2(dBm) \cong P_1(dBm) + 10 \log\left[\frac{1 - \exp^{(-\alpha L_1)}}{1 - \exp^{(-\alpha L_2)}}\right] \quad \text{(Eq. 4)}$$

For example, the values of SBS threshold reported herein correspond to fibers having a length ($L_1$) of about 50 km and an attenuation at 1550 nm of about 0.19 dB/km. Thus, the SBS threshold $P_2$ for an optical fiber of the type disclosed herein having a length $L_2$ and attenuation $\alpha_2$ in dB/Km can be determined from:

$$P_2(dBm) \cong P_1(dBm) + 10 \log\left[\frac{1 - \exp^{(-(0.19*50.5/4.343))}}{1 - \exp^{(-\alpha_2 L_2/4.343)}}\right] \quad \text{(Eq. 5)}$$

Preferably, the optical fiber disclosed herein has a silica-based core and cladding. In preferred embodiments, the cladding has an outer diameter of about 125 μm. Preferably, the outer diameter of the cladding has a constant diameter along the length of the optical fiber. In preferred embodiments, the refractive index of the optical fiber has radial symmetry.

Preferably, the refractive index profile of the optical fiber disclosed herein is non-negative from the centerline to the outer radius of the core 10. In preferred embodiments, the optical fiber contains no index-decreasing dopants in the core 10.

Preferably, the core 10 is comprised of silica doped with germanium, i.e. germania doped silica. Doping of the core, and in particular the central portion of the core, advantageously reduces sound velocity in the optical fiber core relative to its cladding, resulting in total internal reflection of the acoustic field. Dopants other than germanium, singly or in combination, may be employed within the core, and particularly at or near the centerline, of the optical fiber disclosed herein to obtain the desired refractive index and density.

Figure 2:
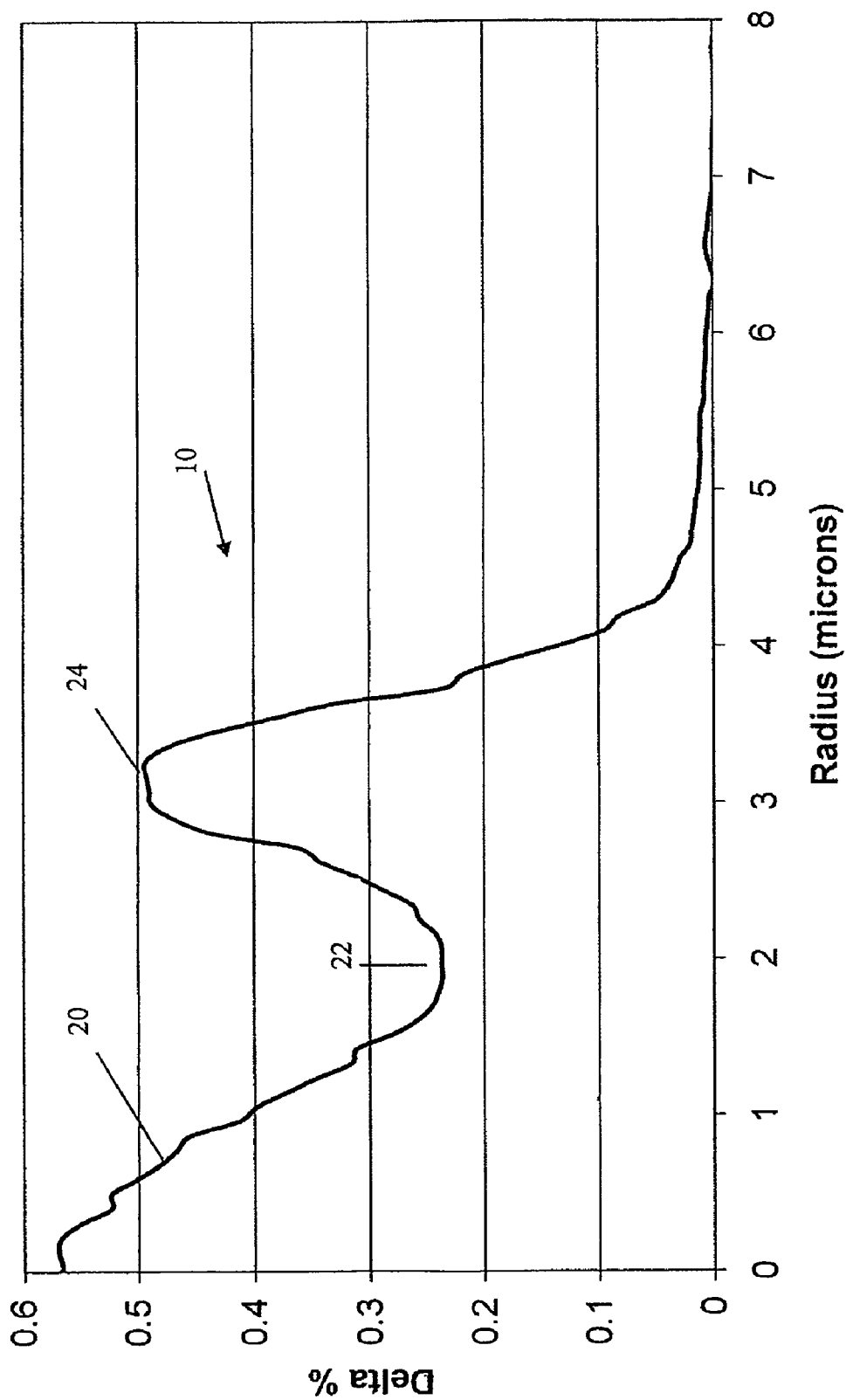
FIG. 2 illustrates the core region of a refractive index profile of an optical fiber (Example 1) in accordance with the invention.
Figure 3:
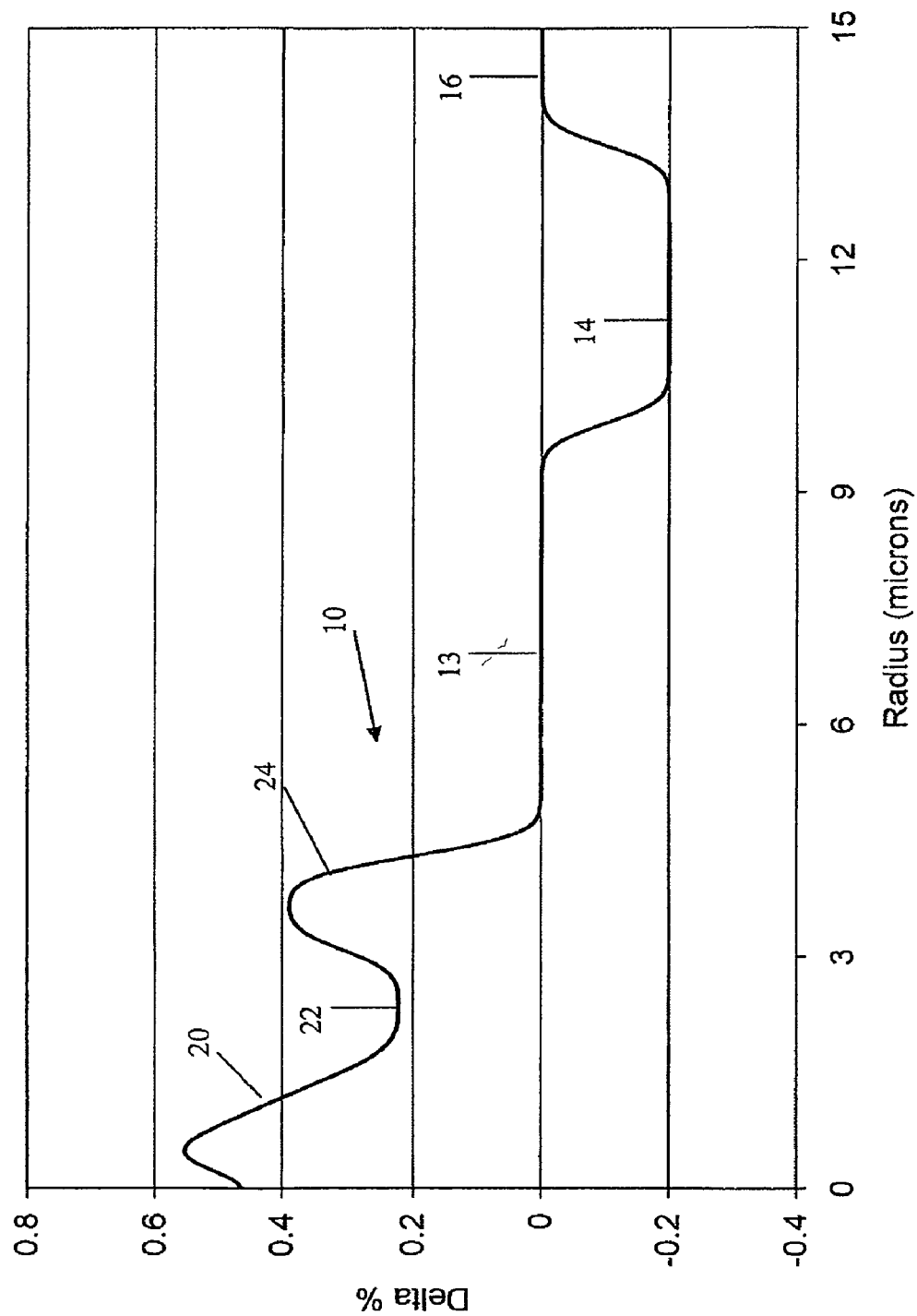
FIG. 3 illustrates another exemplary optical fiber and refractive index profile in accordance with the invention.
Figure 4:
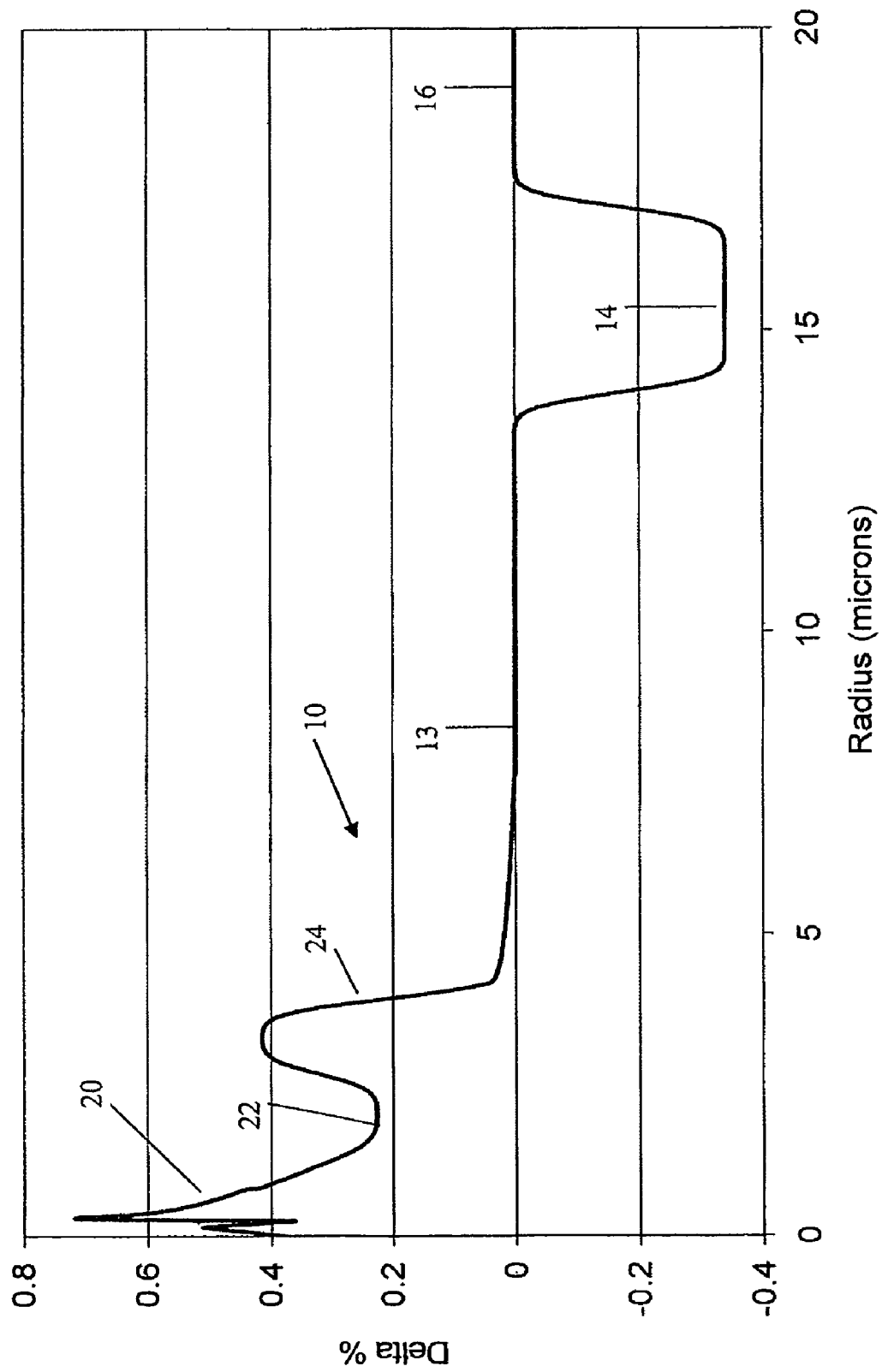
FIG. 4 illustrates another exemplary optical fiber and refractive index profile in accordance with the invention.

As best illustrated in FIGS. 2-4, the core 10 preferably comprises a plurality of segments, more preferably three segments that include a central region 20, an intermediate region 22, and an outer region 24. For example, as shown in FIG. 2, the core region 10 comprises a central region 20 having a maximum relative refractive index $\Delta_1$, an intermediate region 22 surrounding and directly adjacent the central region, the intermediate region having a minimum relative refractive index $\Delta_2$, and an outer region 24 surrounding and directly adjacent the intermediate region, the outer region having a maximum relative refractive index $\Delta_3$, wherein $\Delta_1 > \Delta_2$ and $\Delta_3 > \Delta_2$.

Preferably, the central region of the core extends from the centerline to an outer radius between about 1.5 and 2.5 μm and preferably has a maximum relative refractive index less than 0.7%, more preferably less than 0.6%. Preferably, the minimum refractive index $\Delta_2$ of intermediate region 22 occurs between a radius of about 1.5 and 2.5 μm. Intermediate core region 22 is surrounding and preferably directly adjacent to the central region 20. The intermediate core region comprises a minimum relative refractive index, $\Delta_2$, preferably less than 0.4%, more preferably less than 0.35%. Preferably, $(\Delta_1 - \Delta_2) > 0.25\%$. Preferably, the outer core region 24 surrounds and is directly adjacent to the intermediate core region 22, the outer region 24 extending to the outer core radius of between about 3.5 and 6 μm. The outer core radius is defined herein as the outer region of core 10 where the relative refractive index percent falls to $\Delta = 0.05\%$. In the embodiment illustrated in FIG. 1, this occurs at a radius of about 4.28 μm. In preferred embodiments, at r=3.5 μm, $\Delta_3 >$ about 0.2%, more preferably > about 0.3%, most preferably > about 0.35%. The outer region 24 comprises a maximum relative refractive index $\Delta_3$ which is greater than $\Delta_2$ and less than $\Delta_1$. Preferably, the difference between $\Delta_3$ and $\Delta_2$ is greater than 0.10%, more preferably greater than 0.15%.

In each of the embodiments disclosed herein, the core 10 is surrounded by a cladding 12 which includes at least one annular region 14 in the cladding having a lower refractive index than the remainder of the cladding 12. Preferably, the annular down doped region is displaced from the core (by an inner cladding region 13) at least 2 μm, more preferably at least 4 μm, and more preferably at least 5 μm. This annular region may be comprised of at least one down dopant such as fluorine, and/or a plurality of randomly distributed holes (the terms holes, seeds, voids and airlines are used herein interchangeably, and mean a gaseous region which is trapped within the glass of the optical fiber).

The cladding region 12 of the fiber includes at least one annular region 14 having an index of refraction lower than that of the remainder of the cladding 12. In some embodiments, the at least one annular region in said cladding comprises an elemental down dopant such as fluorine, while in some other embodiments, the at least one annular region in said cladding is formed at least in part by providing non-periodically disposed holes in the annular region. Alternatively, region 14 could comprise both an elemental down dopant such as fluorine and a plurality of randomly or non-periodically distributed holes. The non-periodically disposed holes cause the average effective refractive index of the hole containing region to be less than that of the remainder (i.e., the portion of the cladding which does not contain holes) of the silica cladding.

In one embodiment, the annular down doped region 14 in the cladding is achieved by employing fluorine doping to reduce the refractive index in this region. In some preferred embodiments which employ fluorine doping, the refractive index delta $\Delta_5$ in annular down doped region 14 is less than −0.1, more preferably less than −0.15, and in some embodiments can be less than −0.15 or even less than −0.2. In preferred embodiments, particularly those that employ fluorine as a down doping agent, the absolute magnitude profile volume V of the annular down doped region 14 is greater than 10 percent-microns$^2$, more preferably greater than 20 percent-microns$^2$ and most preferably greater than 30 percent-microns$^2$.

In one embodiment, the annular down doped region 14 in the cladding is achieved using a plurality of non-periodically disposed holes. Preferably the holes have a mean diameter of less than 2000 nm, more preferably less than 1550 nm and most preferably less than 500 nm and greater than 1 nm. The annular hole containing region preferably has the maximum radial width of less than 10 µm, more preferably less than 6 µm and greater than 0.5 µm. The hole containing region also has a regional void area percent of less than 20%, more preferably less than 10% and greater than 0.5%, and most preferably less than 6% and greater than 1%. The annular hole containing region preferably has a radial width which is greater than 0.5 µm and less than 10 µm. The annular hole containing region has a regional void area percent greater than 0.05% and less than 30%.

When randomly distributed holes are employed in annular region 14, the relative percent index of refraction in annular region 14 fluctuates between a refractive index delta of about −28% (refractive index of void filled gas such as argon, nitrogen or krypton relative to that of pure undoped silica glass silica) and that of the glass surrounding the voids (in the embodiments disclosed herein undoped silica glass, with a relative refractive index delta of about 0%). A typical effective relative refractive index percent for region 14 as a result of the mixed random holes and silica glass regions contained therein will be between about −0.5% and −3%, relative to pure silica glass. It is preferable that the mean distance between the holes be less than 5000 nm, more preferably less than 2000 nm, even more preferably less than 1000 nm, for example 750 nm or 500 nm. The annular region 14 preferably has a regional void area percent (cross sectional area of the voids divided by the cross-sectional area for the region 14) less than 20 percent, more preferably less than 15 percent, and most preferably less than 10 percent and greater than 0.5%. Preferably, at least 80%, and more preferably at least 90% of the voids have a maximum cross-sectional diameter of less than 1550 nm. In some embodiments, the mean diameter of the voids is less than 1000 nm, and even more preferably less than 500 nm and greater than 1 nm. The non-periodically located voids are closed (surrounded by solid material) and are non-periodic both in radial cross-section, and along the longitudinal axis of the fiber. That is, the voids 15 may have the same size, or may be of different sizes; the distances between voids may be uniform (i.e., the same), or may be different, but because the voids are non-periodic, either their sizes or their distances between the voids are not the same.

During the manufacture of transmission optical fibers by conventional soot deposition processes such as the outside vapor deposition (OVD) process or the vapor axial deposition (VAD) process, silica and doped silica particles are pyrogenically generated in a flame and deposited as soot. In the case of OVD, silica soot preforms are formed layer-by-layer by deposition of the particles on the outside of a cylindrical target rod by traversing the soot-laden flame along the axis of the cylindrical target. Such porous soot preforms are subsequently treated with a drying agent (e.g., chlorine) to remove water and metal impurities and are then consolidated or sintered into glass blanks at temperatures ranging from 1100-1500° C. Surface energy driven viscous flow sintering is the dominant mechanism of sintering, which results in densification and closing of the pores of the soot, thereby forming a consolidated glass preform. During the final stages of sintering, the gases used in consolidation may become trapped as the open pores are closed. If the solubility and permeability of the trapped gases in the glass are high at the sintering temperature, then the gases are able to migrate through and out of the glass during the consolidation process. Alternatively, gases which are still trapped after the consolidation phase of the fiber manufacturing process may be outgassed by holding the fiber preforms for a period until the gases migrate out through the glass preforms, thereby leaving one or more voids with vacuum therein within the preform. During the draw operation when the optical fiber is drawn from the preform, these voids close, leaving a void-free or essentially void-free optical fiber. In consolidation processes which are employed to make conventional transmission optical fiber, the goal is to achieve an optical fiber that is entirely free of voids in both the core and cladding region of the optical fiber. Helium is often the gas utilized as the atmosphere during the consolidation of conventional optical fiber preforms. Because helium is very permeable in glass, it very easily exits the soot preform and the glass during the consolidation process, so that after consolidating in helium the glass is free of pores or voids.

One method of making a region 14 having non-periodically distributed holes is to subject that region to preform consolidation conditions which are effective to result in a significant amount of gases being trapped in the consolidated glass blank, thereby causing the formation of non-periodically distributed voids in the consolidated glass optical fiber preform. Rather than taking steps to remove these voids, the resultant preform is purposefully used to form an optical fiber with voids therein. In particular, by utilizing relatively low permeability gases and/or relatively high sintering rates, holes can be trapped in the consolidated glass during the consolidation process. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform.

By utilizing the consolidation parameters so that the maximum diameter of the holes or voids is less than the wavelength of the light which is to be transmitted along the length of the fiber (e.g. in the case of optical fibers for use in telecommunications applications, less than 1550 nm), the fiber may be effectively used to transmit information at that particular wavelength.

Preferred sintering gases which may be used in the consolidation step are those which comprise at least one gas selected from the group consisting of air, nitrogen, argon, $CO_2$, oxygen, chlorine, $CF_4$, CO, $SO_2$, krypton, neon, and mixtures thereof. Each of these gases exhibits a relatively low permeability in silica glass at or below the consolidation temperature which is suitable for forming voids in accordance with the methods present invention.

Preferably, when randomly distributed holes are employed in region 14, region 14 comprises a regional void area percent greater than 0.5%, more preferably greater than about 1%, even more preferably greater than 5%, and in some embodiments greater than about 10% and less than 30%. In some embodiments the preferred ranges are greater than 1% and less than 6%.

Methods for making fibers having randomly distributed holes in annular regions are further described, for example, in U.S. patent application Nos. 60/817,721, filed Jun. 30, 2006, and 60/845,927, filed Sep. 20, 2006, the specifications of which are hereby incorporated by reference in their entirety. The holes may include a gas such as nitrogen, air. A preferred gas for inclusion in the holes is Argon, nitrogen and krypton.

The hole-containing region may consist of undoped (pure) silica, thereby completely avoiding the use of any dopants in the hole-containing region, to achieve a decreased refractive index, or the hole-containing region may comprise doped silica e.g. fluorine-doped silica having a plurality of holes.

As illustrated in FIG. 1, in one set of embodiments, the core region 10 includes doped silica to provide a positive refractive index relative to pure silica, e.g. germania doped silica, and the cladding 12 includes a down doped region 14. The core region is preferably hole-free. In some embodiments, an inner annular hole-free region 13 extends from the core region 10 having radius $R_c$, wherein the inner annular hole-free region 13 has a radial width greater than 2 μm. The radial width of the hole free region 16 is preferably greater than 3.5 μm, more preferably greater than 4 μm, and even more preferably greater than 5 μm and less than 20 μm. In the embodiment illustrated in FIG. 1, the down doped region 14 preferably comprises a plurality of randomly distributed holes therein. The intermediate annular down doped region 14 extends radially outward. The outer annular region 16 extends radially outward from down doped region 14, preferably to the outermost radius of the silica portion of the optical fiber. One or more coatings 18 may be applied to the external surface of the silica portion of the optical fiber, starting at the outermost diameter or outermost periphery of the glass part of the fiber. The core region 10 and the cladding region 12 are preferably comprised of silica. The core region 10 is preferably silica doped with one or more dopants. The down doped region 14 has an inner radius which is not more than 20 μm. In some embodiments, the inner radius of the hole containing region is not less than 8 μm and not greater than 16 μm. In other embodiments, the inner radius is not less than 9 μm and not greater than 14 μm. The down doped region 14 has a radial width which is preferably not less than 0.5 μm, more preferably not less than 0.5 μm and not greater than 10 μm, even more preferably not less than 2 μm and not greater than 8 μm, and most preferably not less than 2 μm and not greater than 10 μm.

Table 1 lists an illustrative first set of preferred embodiments which employ randomly distributed holes in region 14 of the cladding which is spaced from the core of the optical fiber. Table 1 sets forth the refractive index delta $\Delta_0$ along the centerline of the optical fiber, the peak refractive index delta $\Delta_1$ and the radial location (R1) of the peak refractive index of the central region 20 of the core, the refractive index delta $\Delta_2$ and the radial location (R2) of the minimum refractive index of the intermediate region 22 of the core, and the refractive index delta $\Delta_3$ and the radial location (R3) of the peak refractive index of the outer region 24 of the core. Also provided is the outer radius R4 of the core, which is also the outer radius of the outer region 24 of the core. The corresponding core structure for Example 1 is also illustrated in FIG. 2. Table 1 also sets forth the location of the inner radius $R_5$ of the down doped annular portion 14 as well as ratio of the radius of the core R4 to the inner radius R5 of down doped region 14 (core/moat ratio). In some preferred embodiments which may be fluorine doped and/or may comprise randomly distributed voids in the down doped annular portion 14, the core/moat ratio is greater than 0.30, more preferably greater than 0.35, even more preferably greater than 0.4, and in some embodiments may be more than 0.43 or even 0.45. Also set forth in Table 1, for each of Examples 1 and 2, are measured zero dispersion wavelength, dispersion at 1310 nm, dispersion slope at 1310 nm, dispersion at 1550 nm, measured mode field diameter at 1310 nm, fiber cutoff wavelength as measured using the 2m cutoff test, cable cutoff as measured by the 22m cutoff test, measured 10 mm bend performance (attenuation increase, in dB), measured 15 mm bend performance (attenuation increase, in dB), and measured 20 mm bend performance (attenuation increase, in dB). Also set forth in Table 1 for examples 1 and 2 are the air fill percent of region 14, mean hole diameter of the holes which make up the randomly distributed holes, the approximate number of holes that are seen in a cross section of the optical fiber, and the standard deviation of the hole size diameter. Table 1 also gives the measured SBS threshold for 10 km of fiber. For comparison, 10 km of standard single mode fiber with a step index core and an attenuation of 0.19 dB/km such as SMF-28e® optical fiber from Corning Incorporated has an SBS threshold of about 10.2 dBm.

TABLE 1

| Profile | Example 1 | Example 2 |
|---|---|---|
| $\Delta_0$ | 0.56 | 0.53 |
| $R_1$ | 0.13 | 0 |
| $\Delta_1$ | 0.57 | 0.53 |
| $R_2$ | 1.89 | 1.91 |
| $\Delta_2$ | 0.236 | 0.245 |
| $R_3$ | 3.17 | 3.21 |
| $\Delta_3$ | 0.49 | 0.45 |
| $R_4$ | 4.28 | 4.68 |
| $R_5$ | 12.59 | 9.40 |
| $W_5$ | 2.5 | 3 |
| Effective avg. % index in ring 14 | −1.49 | |
| $R_4/R_5$ | 0.34 | 0.50 |

| Fiber ID | Measured Zero Dispersion (nm) | 1310 Dispersion (ps/nm/km) | 1310 Slope (ps/nm²/km) | 1550 Dispersion (ps/nm/km) | Measured 1310 MFD (microns) | 1550 attenuation (dB/Km) |
|---|---|---|---|---|---|---|
| Example 1 | 1321 | −0.98 | 0.087 | 16.49 | 9.07 | 0.192 |
| Example 2 | 1300 | 0.95 | 0.096 | 19.82 | 8.74 | 0.197 |

TABLE 1-continued

| Fiber ID | 2 m Cutoff (nm) | 22 m Cutoff (nm) | 1 × 10 mm Macrobend (dB/turn) | 1 × 15 mm Macrobend (dB/turn) | 1 × 20 mm Macrobend (dB/turn) | SBS Threshold for 10 km (dBm) |
|---|---|---|---|---|---|---|
| Example 1 | 1365 | 1267 | 0.34 | 0.21 | 0.006 | 13.8 |
| Example 2 | 1310 | 1289 | 0.33 | NA | NA | 14.2 |

| Fiber ID | Air Fill % | Minimum % index in ring | Mean Hole Diameter, micron | Number of holes in fiber cross-section | Hole Diameter StDev, microns |
|---|---|---|---|---|---|
| Example 1 | 5.9 | −28 | 0.32 | 192 | 0.1 |
| Example 2 | 6 | −28 | 0.3 | 170 | 0.1 |

The optical fibers illustrated by Examples 1 and 2 have a MFD at 1310 nm not less than about 8.2 μm. Preferably, the 2 m fiber cutoff is less than about 1500 nm. Preferably, cabled cutoff is less than about 1400 nm, more preferably less than about 1300 nm. In some embodiments, the core may comprise a relative refractive index profile having a so-called centerline dip which may occur as a result of one or more optical fiber manufacturing techniques. However, the centerline dip in any of the refractive index profiles disclosed herein is optional. The core comprises a first portion extending from the centerline to a maximum occurring at a radius less than 1 μm. The moat volume of down doped annular region 14 in example 1 was about −103 square microns, while the moat volume of down doped annular region 14 in example 2 was about −97 square microns (both of these examples employed doped annular region 14 whose effective refractive index delta was about −1.49 percent). In preferred embodiments which employ randomly distributed voids to reduce the refractive index in the down doped annular region 14, the absolute magnitude of the profile volume of the down doped annular region 14 is greater than 20 percent-microns$^2$, more preferably greater than 40 percent-microns$^2$, and most preferably greater than 60 percent-microns$^2$, although the absolute magnitude of the profile volume of the down doped annular region 14 could even be higher than 80 percent-microns$^2$.

In preferred embodiments, optical fibers such as those illustrated by FIG. 1 and Examples 1 and 2 disclosed herein preferably have: a dispersion at 1550 nm of greater than 10 ps/nm-km, more preferably between 10 and 21 ps/nm-km, even more preferably between 16 and 21 ps/nm-km; a dispersion slope at 1550 nm of less than 0.07 ps/nm$^2$-km, more preferably between 0.05 and 0.07 ps/nm$^2$-km; a 20 mm bend loss less than about 0.5 dB/turn, more preferably less than 0.1 dB/turn, even more preferably less than about 0.05 dB/turn; a 10 mm bend lossless than about 5 dB/turn, more preferably less than about 2 dB/turn, even more preferably less than about 1 dB/turn; zero dispersion wavelength less than 1340 mm, more preferably less than 1324 nm, even more preferably between 1300 and 1324 nm, even more preferably less than 1320 nm, even more preferably less than 1315 nm; an MFD at 1310 mm greater than 8.2 μm, and in some preferred embodiments greater than 8.8 μm, and in other preferred embodiments between 8.6 μm and 9.5 μm; a dispersion at 1310 mm having a magnitude less than 5 ps/nm-km, more preferably less than 3 ps/nm-km; and a dispersion slope at 1310 nm of less than 0.10 ps/nm$^2$-km. more preferably less than 0.093 ps/nm$^2$-km.

Table 2 lists an illustrative set of preferred embodiments (Examples 3-7) which employ a fluorine doped region 14 of the cladding which is spaced from the core of the optical fiber. FIGS. 3 and 4 show the corresponding refractive index profiles of Examples 3 and 7, respectively. Table 2 sets forth the refractive index delta along the centerline of the optical fiber $\Delta_0$, the refractive index delta $\Delta_1$ of the central region 20 of the core, the refractive index delta $\Delta_2$ of the intermediate region 22 of the core, and the maximum refractive index delta $\Delta_3$ of the outer region of the core. The corresponding core structure for each example is also illustrated in FIG. 2. Table 2 also sets forth the inner radius of the down doped annular cladding region 14 as well as the minimum refractive index in region 14. Also set forth is the ratio of the outer radius of the core to the inner radius of the annular region 14 (core/moat ratio). Also set forth is the profile volume V of the down doped annular region 14. In preferred embodiments which employ fluorine doping as the dopant in the down doped annular region 14, the absolute magnitude of the profile volume of the down doped annular region 14 is greater than 10 percent-microns$^2$, more preferably greater than 20 percent-microns$^2$, and most preferably greater than 30 percent-microns$^2$. Also set forth in Table 2, for each of Examples 1 and 2, are the modeled zero dispersion wavelength, dispersion at 1310 nm, dispersion slope at 1310 nm, dispersion at 1550 nm, mode field diameter at 1310 nm, modeled cable cutoff wavelength and theoretical cutoff of the LP11 mode, and modeled SBS threshold increase (SBSt) compared to approximately the same length of standard single mode fiber having an attenuation of 0.19 dB/km.

TABLE 2

|  | Example 3 | Example 4 | Example 5 | Example 6 | Example 7 | Example 8 |
|---|---|---|---|---|---|---|
| $\Delta_0$ | 0.46 | 0.46 | 0.55 | 0.4 | 0.4 | 0.49 |
| $R_1$ | 0.48 | 0.5 | 0.35 | 0.33 | 0.33 | 0.38 |
| $\Delta_1$ | 0.55 | 0.56 | 0.56 | 0.71 | 0.72 | 0.51 |
| $R_2$ | 2.35 | 2.33 | 2.33 | 2.35 | 2.1 | 2.33 |
| $\Delta_2$ | 0.22 | 0.22 | 0.22 | 0.22 | 0.23 | 0.19 |
| $R_3$ | 3.65 | 3.6 | 3.63 | 3.63 | 3.35 | 3.45 |
| $\Delta_3$ | 0.388 | 0.404 | 0.44 | 0.43 | 0.41 | 0.46 |

TABLE 2-continued

|  | Example 3 | Example 4 | Example 5 | Example 6 | Example 7 | Example 8 |
|---|---|---|---|---|---|---|
| $R_4$ | 4.56 | 4.45 | 4.38 | 4.38 | 4.17 | 4.33 |
| $R_5$ | 9.6 | 9.63 | 9.38 | 11.33 | 13.65 | 10.075 |
| $W_5$ | 4.18 | 2.65 | 2.72 | 2.4 | 3.7 | 5.82 |
| $\Delta_4$ | −0.2 | −0.2 | −0.15 | −0.31 | −0.34 | −0.4 |
| $R_4/R_5$ | 0.48 | 0.46 | 0.47 | 0.39 | 0.31 | 0.43 |
| Moat profile volume | −17 | −10 | −7 | −14 | −32 | −42 |
| Disp 1310 (ps/nm/km) | −0.24 | −0.29 | 0.00 | −0.45 | −0.61 | 0.16 |
| Slope 1310 (ps/nm$^2$/km) | 0.0928 | 0.0920 | 0.0906 | 0.0900 | 0.0873 | 0.0908 |
| Zero Dispersion (nm) | 1313 | 1313 | 1310 | 1315 | 1317 | 1308 |
| MFD 1310 (microns) | 9.18 | 9.04 | 9.20 | 9.20 | 9.25 | 9.19 |
| MFD 1550 (microns) | 10.39 | 10.23 | 10.40 | 10.40 | 10.45 | 10.36 |
| Aeff 1550 (sq. microns) | 82.9 | 80.4 | 84.9 | 84.9 | 85.8 | 83.7 |
| Attn 1550 (dB/km) | 0.193 | 0.194 | 0.193 | 0.194 | 0.194 | 0.194 |
| SBSt (dB) | 4.00 | 3.91 | 4.23 | 4.29 | 4.13 | 4.32 |
| LP11 cutoff (nm) | 1248 | 1272 | 1253 | 1280 | 1235 | 1253 |
| cable cutoff (nm) | 1202 | 1200 | 1180 | 1195 | 1200 | 1235 |

Thus for the fibers shown in Examples 1-7, the absolute SBS threshold in dBm is greater than about $9.3+10\log[(1-e^{-(0.19)(50)/4.343})/(1-e^{-(\alpha)(L)/4.343})]$, wherein L is the length in km and $\alpha$ is the attenuation in dB/km at 1550 nm wherein the optical fibers have a fiber cutoff of less than 1400 nm.

It is to be understood that the foregoing description is exemplary of the invention only and is intended to provide an overview for the understanding of the nature and character of the invention as it is defined by the claims. For example, embodiments which employ a fluorine doped region 14 could alternatively or additionally employ a region 14 having non-periodically distributed holes, and vice versa. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber for transmitting optical signals comprised of light, the optical fiber comprising:
    a core region disposed about a longitudinal centerline and having a refractive index profile with a first refractive index, and
    a cladding region surrounding the core region, the cladding region comprising at least one annular region having an index of refraction lower than that of the remainder of the cladding;
    wherein the refractive index of the core is selected to provide: an absolute SBS threshold in dBm greater than about $9.3+10\log[(1-e^{-(0.19)(50)/4.343})/(1-e^{-(\alpha)(L)/4.343})]$, wherein L is the length in km and $\alpha$ is the attenuation in dB/km at 1550 nm wherein the optical fiber has a fiber cutoff of less than 1400 nm.

2. The optical fiber of claim 1, wherein the refractive index of the core is selected to provide: an absolute SBS threshold in dBm greater than about $9.8+10\log[(1-e^{-(0.19)(50)/4.343})/(1-e^{-(\alpha)(L)/4.343})]$, wherein L is the length in km and $\alpha$ is the attenuation in dB/km at 1550 nm.

3. The optical fiber of claim 1 wherein said at least one annular region comprises a maximum radial width of less than 10 microns.

4. The optical fiber of claim 1 wherein the optical fiber comprises a core refractive index profile which is selected to provide a zero dispersion wavelength of less than 1350 nm.

5. The optical fiber of claim 1, wherein the core region comprises a central region having a maximum relative refractive index $\Delta_{1MAX}$, an intermediate region surrounding and directly adjacent the central region, the intermediate region having a minimum relative refractive index $\Delta_{2MIN}$, and an outer region surrounding and directly adjacent the intermediate region, the outer region having a maximum relative refractive index $\Delta_{3MAX}$, wherein $\Delta_{1MAX} > \Delta_{2MIN}$ and $\Delta_{3MAX} > \Delta_{2MIN}$.

6. The optical fiber of claim 1 wherein the optical fiber comprises a core refractive index profile which is selected to provide a cable cutoff of less than 1260 nm.

7. The optical fiber of claim 1 wherein the optical fiber comprises a core refractive index profile which is selected to provide a 20 mm macrobend induced loss of less than 0.5 dB/turn at 1550 nm.

8. The optical fiber of claim 1 wherein the optical fiber comprises a core refractive index profile which is selected to provide a 20 mm macrobend induced loss of less than 0.1 dB/turn at 1550 nm.

9. The optical fiber of claim 1, wherein said at least one annular region in said cladding is formed by non-periodically disposed holes in said annular region.

10. The optical fiber of claim 9, wherein the non-periodically disposed holes have a maximum diameter of less than 2000 nm.

11. The optical fiber of claim 9, wherein the non-periodically disposed holes have a mean diameter of less than 2000 nm.

12. The optical fiber of claim 9, wherein the annular hole-containing region has a regional void area percent of greater than 0.5 percent and less than 20 percent.

13. The optical fiber of claim 1, wherein said at least one annular region in said cladding comprises fluorine.

14. The optical fiber of claim 13, wherein the core/moat ratio of said fiber is greater than 0.30.

15. The optical fiber of claim 3, wherein the absolute magnitude profile volume V of the annular region having index of refraction lower than the remainder of the cladding is greater than 10 percent–microns$^2$.

16. The optical fiber of claim 1, wherein the core/moat ratio of said fiber is greater than 0.30.

17. The optical fiber of claim 1, wherein the absolute magnitude profile volume V of the annular region having index of refraction lower than the remainder of the cladding is greater than 10 percent–microns$^2$.

18. A microstructured optical fiber for transmitting optical signals comprised of light, the optical fiber comprising:
   a core region disposed about a longitudinal centerline, and
   a cladding region surrounding the core region, the cladding region comprising an annular hole-containing region comprised of non-periodically disposed holes;
   wherein the annular hole-containing region has a maximum radial width of less than 10 microns;
   wherein the annular hole-containing region has a regional void area percent of less than 30 percent; and wherein the refractive index of the core is selected to provide: an absolute SBS threshold in dBm greater than about 9.3 +10log[(1−e$^{-(0.19)(50)/4.343}$)/(1−e$^{-(\alpha)(L)/4.343}$)], wherein L is the length in km and $\alpha$ is the attenuation in dB/km at 1550 nm.

19. The optical fiber of claim 18 wherein said cladding region further comprises:
   an inner annular hole-free region disposed between the core region and the annular hole-containing region; and
   an outer annular hole-free region surrounding and directly adjacent the annular hole-containing region.

20. The optical fiber of claim 19 wherein the inner annular hole-free region has a radial width greater than 1 μm.

21. The optical fiber of claim 18 wherein the annular hole-containing region has a maximum radial width of greater than 0.5 microns and less than 10 microns, and the non-periodically disposed holes have a mean diameter of less than 1550 nm.

22. The optical fiber of claim 18 wherein the annular hole-containing region has a regional void area percent of greater than 0.05 percent and less than 20 percent.

23. The optical fiber of claim 18 wherein the non-periodically disposed holes have a mean diameter of greater than 1 nm and less than 1550 nm.

24. The optical fiber of claim 18 wherein the non-periodically disposed holes have a maximum diameter of less than 2000 nm.

25. A microstructured optical fiber for transmitting optical signals comprised of light, the optical fiber comprising:
   a core region disposed about a longitudinal centerline, and
   a cladding region surrounding the core region, the cladding region comprising an annular hole-containing region comprised of non-periodically disposed holes and an inner annular hole-free region disposed between the core region and the annular hole-containing region; and
   an outer annular hole-free region surrounding and directly adjacent the annular hole-containing region;
   wherein the annular hole-containing region has a maximum radial width of less than 10 microns;
   wherein the annular hole-containing region has a regional void area percent of less than 30 percent; and wherein the refractive index of the core is selected to provide: an absolute SBS threshold in dBm greater than about 9.3 +10log[(1−e$^{-(0.19)(50)/4.343}$)/(1−e$^{-(\alpha)(L)/4.343}$)], wherein L is the length in km and $\alpha$ is the attenuation in dB/km at 1550 nm.

\* \* \* \* \*